United States Patent
Mühlfelder

(10) Patent No.: US 8,090,527 B2
(45) Date of Patent: Jan. 3, 2012

(54) METHOD FOR OPERATING A NAVIGATION SYSTEM

(75) Inventor: Mathias Mühlfelder, Würzburg (DE)

(73) Assignee: Navigon AG, Hamburg (DE)

(*) Notice: Subject to any disclaimer, the term of this patent is extended or adjusted under 35 U.S.C. 154(b) by 850 days.

(21) Appl. No.: 12/131,194

(22) Filed: Jun. 2, 2008

(65) Prior Publication Data

US 2008/0312821 A1    Dec. 18, 2008

(30) Foreign Application Priority Data

Jun. 14, 2007  (DE) .......................... 10 2007 027 982
Jul. 26, 2007  (DE) .......................... 10 2007 035 471

(51) Int. Cl.
*G01C 21/36* (2006.01)
*G01C 21/00* (2006.01)

(52) U.S. Cl. .................... 701/201; 701/202; 340/995.23

(58) Field of Classification Search .................. 701/201, 701/202, 209, 210; 340/995.23
See application file for complete search history.

(56) References Cited

U.S. PATENT DOCUMENTS

| | | | |
|---|---|---|---|
| 4,984,168 A * | 1/1991 | Neukrichner et al. | 701/210 |
| 5,612,881 A | 3/1997 | Moroto et al. | |
| 5,787,383 A * | 7/1998 | Moroto et al. | 701/210 |
| 6,064,322 A | 5/2000 | Ohira | |
| 2004/0243307 A1 | 12/2004 | Geelen | |
| 2006/0089798 A1* | 4/2006 | Kaufman et al. | 701/211 |
| 2007/0005233 A1* | 1/2007 | Pinkus et al. | 701/200 |
| 2007/0276584 A1* | 11/2007 | Veliu et al. | 701/200 |
| 2008/0094255 A1* | 4/2008 | Bethel | 340/971 |

FOREIGN PATENT DOCUMENTS

| | | |
|---|---|---|
| DE | 19963567 C1 | 9/2001 |
| EP | 0945707 A2 | 9/1999 |
| EP | 1267146 A1 | 12/2002 |

OTHER PUBLICATIONS

User Manual TomTom One.
Lagerkvist, A., CeBIT 2007: Navigon Shows Off New Satnavs, Mar. 19, 2007, www.techradar.com.
Featuring Lane Assistance: Navigon 5100 and 7100 at the CeBit, First Self-Developed Devices Display Optimal Lane by Means of Small Arrows, Mar. 22, 2007, www.heise.de.
Navigon, User's Manual, Navigon 5100 / 5110, English Translation: pp. 28 and 29, Jun. 2007.
European Search Report dated May 11, 2011.

* cited by examiner

Primary Examiner — Khoi Tran
Assistant Examiner — Jason Holloway
(74) Attorney, Agent, or Firm — Samuel M. Korte

(57) ABSTRACT

A method for operating a navigation system includes the following steps: a) inputting a destination; b) deriving a starting point from the destination being input by utilizing a starting point derivation rule; c) calculating a route from the derived starting point to the destination being input, and d) outputting the simulated route preview from the derived starting point to the destination being input. Preferably, the navigation system includes an input device for inputting operator commands and/or location information, particularly starting points and/or destinations, a road network database, a route calculating unit for calculating a planned route with consideration of the location information and the road network database, wherein the route leads from the starting point to the destination, a signal receiving unit for receiving position signals, particularly GPS signals, a position finding unit that determines the current position from the position signals, and at least one optical and/or acoustical output device for optically and/or acoustically outputting a simulated route preview in a simulation mode, wherein the simulated route preview simulates the route navigation from a starting point to a destination.

18 Claims, 3 Drawing Sheets

METHOD FOR OPERATING A NAVIGATION SYSTEM

CROSS-REFERENCE TO RELATED APPLICATION

This application claims the priority benefit of German Patent Application No. 10 2007 027 982.7 filed on Jun. 14, 2007 and German Patent Application No. 10 2007 035 471.3.8 filed on Jul. 26, 2007, the contents of which are hereby incorporated by reference as if fully set forth herein in their entirety.

STATEMENT CONCERNING FEDERALLY SPONSORED RESEARCH OR DEVELOPMENT

Not applicable.

FIELD OF THE INVENTION

The invention pertains to a method for operating a navigation system.

BACKGROUND OF THE MENTION

Navigation systems of the generic type, for example, in the form of mobile navigation devices, serve for navigating the user from a starting point to a destination along a suitable route. For this purpose, the navigation system features an input device that enables the user to input operator commands, particularly location information for specifying the starting point and/or the destination. The planned route from the starting point to the destination is calculated by a route calculating unit that utilizes a road network database, in which a geographic region is described in the form of machine-readable data.

The navigation systems furthermore comprise a signal receiving unit for receiving suitable position signals. These signals may consist, in particular, of satellite signals from GPS satellites or similar satellite systems. It would also be conceivable to additionally process position signals as they are transmitted by the central control of a motor vehicle, for example, speed and acceleration signals. The navigation system then determines the current position from the received position signals by means of a position finding unit.

Lastly, the navigation system also comprises an output device for optically or acoustically outputting signals to the user. Suitable output devices consist, for example, of monitor units or loudspeaker units. In navigation systems of the generic type, the output device is suitable, in particular, for optically or acoustically outputting a simulated route preview in a simulation mode. The simulated route preview in the simulation mode serves for informing the user of the functionality of the navigation system. The user should have the option, in particular, to test the navigation system under realistic conditions prior to the purchase, particularly with real voice announcements and with real map views. The option to check the functionality of the navigation system is very important for the purchasing decision.

In known navigation systems, only the destination needs to be input in order to properly operate the navigation system in the normal mode, in order to navigate the user from a starting point to a destination. The starting point is usually set as the current position that is determined by evaluating the position signals with the aid of the position finding unit. However problems arise if the starting point is determined in this fashion in the simulation mode of known navigation systems.

Navigation devices displayed in a retail store usually are unable to receive GPS signals because the satellite signals cannot penetrate the structure of the retail store. Due to the lacking satellite signals, the starting point therefore cannot be automatically determined in conventional fashion by evaluating the current position. The starting point needs to be input manually in order to also realize the simulation mode for the route simulation in instances, in which the current position is indeterminable. However, investigations have shown that the customers regularly do not input the starling point due to their inexperience, namely because this also does not correspond to the normal operating sequence when using a navigation system. This is the reason why the simulation mode is usually not activated by potential buyers. This is very disadvantageous because the purchasing decision of the user is then usually based on irrational purchasing criteria and the available functionality of the navigation system is not even tested.

In other known methods, the last known position determined with the aid of positioning means is used as the starting point. However, devices on display in retail stores usually have not yet received a last position. The definition of fixed starting points for the demonstration mode at the factory can result in undesirably long simulation routes or not be covered by the actually existing map base.

SUMMARY OF THE INVENTION

Based on this state of the art, the present invention aims to propose a hew method for operating a navigation system, in which the simulation mode also can be very easily started in the normal mode in accordance with conventional operating procedures.

This objective is attained in one embodiment with a method for operating a navigation system, in which the navigation system includes an input device for inputting operator commands and/or location information, particularly starting points and/or destinations, a road network database, a route calculating unit for calculating a planned route with consideration of the location information and the road network database, wherein the route leads from the starting point to the destination, a signal receiving unit for receiving position signals, particularly GPS signals, a position finding unit that determines the current position from the position signals, and at least one optical and/or acoustical output device for optically and/or acoustically outputting a simulated route preview in a simulation mode, wherein the simulated route preview simulates the route navigation from a starting point to a destination. The method comprises the following steps:
 a) inputting a destination;
 b) deriving a starting point from the destination being input by utilizing a starting point derivation rule;
 c) calculating a route from the derived starting point to the destination being input, and
 d) outputting the simulated route preview from the derived starting point to the destination being input.

The inventive method is based on the basic idea that a starting point derivation rule is stored in the navigation system. The starting point derivation rule makes it possible to automatically derive a starting point for realizing the simulation mode from the destination input by the user, namely without requiring further actions on the part of the user.

In the inventive method, the user initially inputs the desired destination. If a simulation mode cannot be realized yet at that time, for example, because the current position cannot be set as the starting point for the route calculation due to the lack of satellite signals, a starting point is derived from the destination being selected or input with the aid of the starting point derivation rule. Consequently, a destination and a starting point are available for realizing the simulation mode, wherein the destination was input by the user in accordance with normal expectations while the starting point was automatically derived by the navigation system with the aid of the starting point derivation rule without any actions on the part of the user.

Subsequently, the navigation system calculates a route from the derived starting point to the destination being input in accordance with its usual functionality and outputs a simulated route preview from the derived starting point to the destination being input.

The inventive method ensures that the user merely needs to input the desired destination in order to start the simulation mode and to output the simulated route preview, wherein this corresponds to the conventional use of a navigation system in the normal operating mode. The input of the starting point is not required because the starting point is automatically derived from the destination being input by the navigation system in accordance with the predetermined starting point derivation rule.

During the operation of the navigation system, it is possible that the current position can be determined from the position signals or not depending on the position of the navigation system. If the current position can be determined from the received position signals, it is preferred to use the current position as the starting point for the simulated route preview in the simulation mode. According to one preferred variation of the inventive method, it is proposed dial the navigation system initially checks if the current position can be determined from the position signals after a destination has been input.

The starting point is only derived from the destination with the aid of the starting point derivation rule if the current position cannot be determined from the position signals, wherein the simulation mode of the navigation system is started with the derived starting point in this case. However, if the current position can be determined from the position signals, the current position is used as the starting point of the simulated route preview. This variation of the method is also sensible after the navigation system has been started by the user, i.e., after the actual purchasing decision. The user has the option of inputting a destination at the beginning of the drive, wherein the navigation system initially calculates and outputs a route in the simulation mode by utilizing a starting point derived with the aid of the starting point derivation rule if a sufficient GPS signal is not yet available. However, this is not the route that navigates the user from his current location to the destination. This is usually inconsequential because the user is familiar with the very first road segments from his current location in most instances. Despite lacking GPS signal, this variation of the inventive method makes it possible to already output a route preview for the user in the simulation mode. As soon as a sufficient satellite signal is available, the route is automatically recalculated from the current location and is output for the user in the normal mode.

The inventive method basically may be started in any suitable way. According to a first preferred variation of the method, it is proposed that the start of the simulation mode takes place automatically if the current position cannot be determined from the position signals. This means that the simulation mode is respectively activated automatically by utilizing the starting point derived with the aid of the starting point derivation rule after the user has input a destination.

Alternatively, it would also be possible to initially check if the current position can be determined by means of the position signals. If this is not the case, it would be possible to prompt the user to consent to starting the simulation mode by using the derived starting point. In this case, the simulation mode is only started if a positive response is received from the user.

The termination of the simulation mode and the change-over to the normal mode may also be dependent on the consent of the user in instances, in which the current position could initially not be determined and a sufficient position signal is once again available at a later time. To this end, it would be possible, for example, to superimpose an inquiry menu on the output device that needs to be correspondingly acknowledge by the user in order to terminate the simulation mode.

The starting point basically can be derived from the destination being input with the aid of the starting point derivation rule in accordance with any criteria. According to one preferred variation of the method, it is specified in the starting point derivation rule that the derived starting point lies in the same city or in the same town as the destination being input. This ensures that a route leading from a starting point to a destination in the same city or in the same town is output in the simulated route preview and that the starting point actually exists. Since the furthermore concerns the town or the city specified by the user's input of the destination, it is ensured that the user can relate to the route preview being output. In addition, the route preview being output usually will have a suitable length for providing the user with a characteristic impression of the functionality of the navigation system in the simulation mode within a reasonable period of time.

Depending on the type of input or selection, e.g., a POI, an address book entry or a selected coordinate, the destination being input or selected could not have an assigned municipality yet. In this case, it is advantageous if the municipality, in which the destination is located, is initially analyzed with the aid of the map database based on the position of the destination before the starting point derivation rule is applied.

If the starting point derived with the aid of the starting point derivation rule lies in the same city or the same town as the destination, it is particularly advantageous if the starting point is arranged in the center of this city or in the center of this town. The users are typically familiar with the center of a city or a town such that a route from the center to the destination being input, which usually should be known by the users due to their familiarity with the surroundings, is output in the simulated route preview. In this respect, the users can also check the functionality of the navigation system in the simulated route preview based on their own familiarity with the surroundings. In addition, the arrangement of the starting point in the center of the city or the town ensures that the routes of the simulated route preview most likely are relatively short because the center of a city or a town is located a minimal distance from all other points of the town or the city, respectively.

In order to automatically determine a starting point that is derived from the destination information, it is particularly advantageous to resort to the preferred points that are characterized in the map material and usually referred to as Points of Interest (POI). These Points of Interest are clearly specified in the machine-readable map material of the road network database and can be easily selected by the navigation system by utilizing the starting point derivation rule.

In order to automatically identify a Point of Interest in the center of a city or town by means of me navigation system, it is particularly advantageous to resort to the categories specified in the map material. For example, a category "City-Center" is usually provided that characterizes the Points of Interest in the center of a city or a town. If a search for this category is carried out in the Points of Interest of a city, the center of the city or town can be automatically selected.

With respect to towns for which no "CityCenter" Point of Interest is stored in the map database, it is also advantageous to define a corresponding alternative point for the CityCenter by means of geometric methods in a pre-processing step of the map generation.

With respect to the output of the simulated route preview, it is important that the route preview is neither excessively long nor excessively short. It is therefore particularly advantageous if the distance between the derived starting point and the destination being input or the length of the route preview resulting thereof is determined after the derivation of the starting point from the destination and is compared with respective predetermined values of a maximum distance and/or maximum length or a minimum distance and/or minimum length. If the distance between the starting point and the destination or the length of the route preview exceeds or falls short of the respective maximum or minimum values specified in the navigation system, the first starting point derived with the aid of the starting point derivation rule can be discarded and a second starting point can be determined with a second starting point derivation rule. Naturally, this second starting point can also be subjected to a corresponding check and discarded, if applicable.

Numerous options are also available for structuring the second starting point derivation rule. According to one preferred variation, the second starting point derivation rule specifies that the second starting point is a Point of Interest that lies within a predetermined search radius around the first derived starting point. In this case, the search radius around the first starting point for determining the second starting point should preferably be increased incrementally. As soon as a first preferred point (Point of Interest) is located within the search radius, the search for the second starting point is interrupted and, if applicable, the distance between the second starting point and the destination being input or the length of the route preview resulting thereof is checked once again.

The second starting point preferably should also lie within the same city or within the same town as the destination, wherein the second starting point may fall under a different category than the first starting point in such instances. This ensures that the search for the second starting point usually leads to suitable results. An alternative point for the CityCenter determined by means of geometric methods may also be taken into consideration in this case.

In order to provide the user with the broadest possible overview of the functionality of the navigation system during the route preview of the simulation mode, the route output during the route preview of the simulation mode should be driven with a predetermined speed profile. The respectively required maneuvering instructions output while driving in the normal mode should also be optically and/or acoustically displayed or announced to the user during the output of the route preview.

It is furthermore particularly advantageous if the user is able to input interactive user commands during the route preview in order to also demonstrate this functionality of the navigation system in the normal mode by using the navigation system in the simulation mode. This includes, e.g., the possible change between different map modes such as a 2D and a 3D mode, the change between day/night color schemes, zooming and panning in the map, the option of blocking route segments and/or setting additional intermediate points. If traffic messages are received, e.g., via TMC, it would also be conceivable to take into account and bypass these traffic messages automatically or on request.

In order to exclude an accidental activation of the simulation mode, it is particularly advantageous if an identification element assigned to the simulated route preview is output, in particular displayed on the monitor, during the output of the simulated route preview. It would be possible, for example, to display the terms "Demo" or "Simulation" on the monitor in order to inform the user that the route preview being output represents a simulation and does not correspond to an actually desired route.

Different aspects of the invention are schematically illustrated in the figures and described in an exemplary fashion below.

DETAILED DESCRIPTION OF THE EXAMPLE EMBODIMENTS

Figure 1:
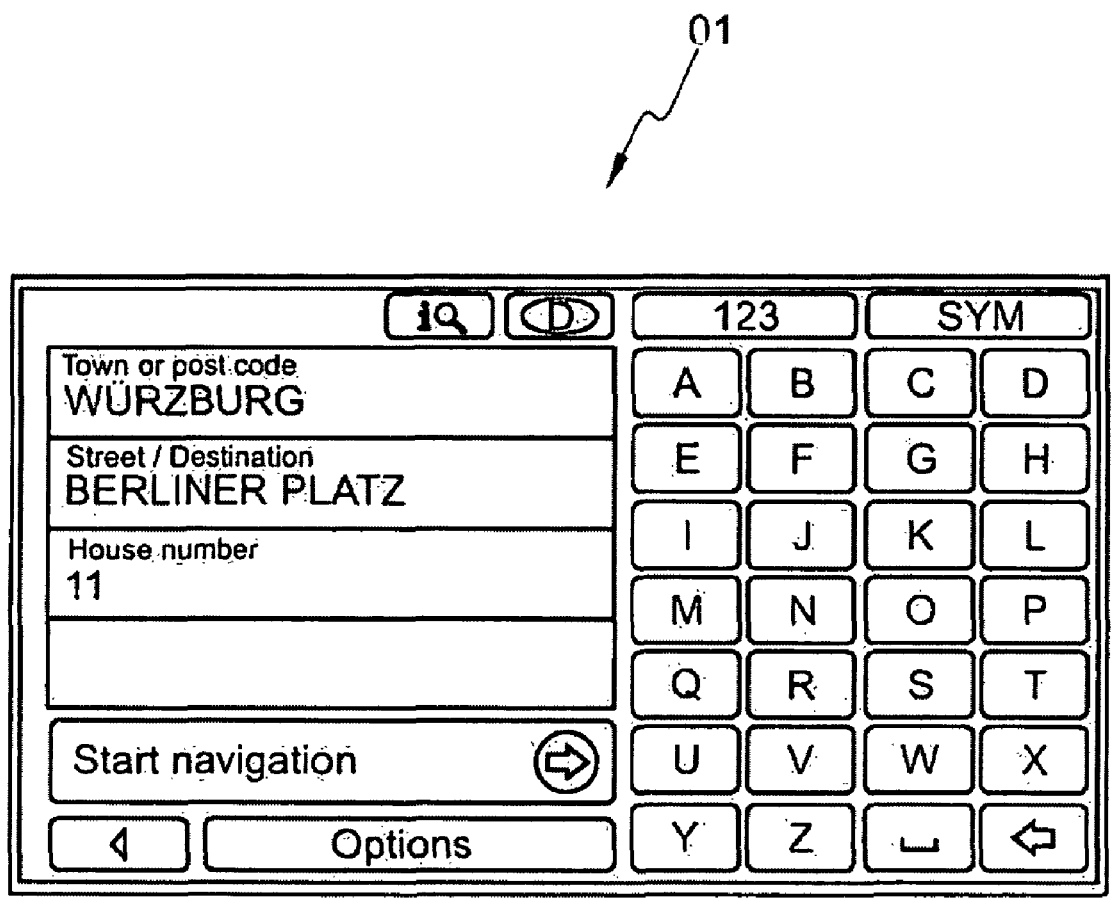
FIG. 1, the touch-screen of a mobile navigation device while inputting a destination.

FIG. 1 shows the display on a touch-screen 01 while inputting a destination. The navigation system is located, for example, in a retail store and cannot receive position signals from the GPS satellites due to the shielding of the navigation satellites. After inputting the destination "Würzburg, Berliner Platz 11," the navigation mode is started by the user pressing the button "Start Navigation." Subsequently, the navigation system automatically checks if the current position can be determined by evaluating the GPS signals. If this is not the case, the selection menu illustrated in FIG. 2 is displayed.

Figure 2:
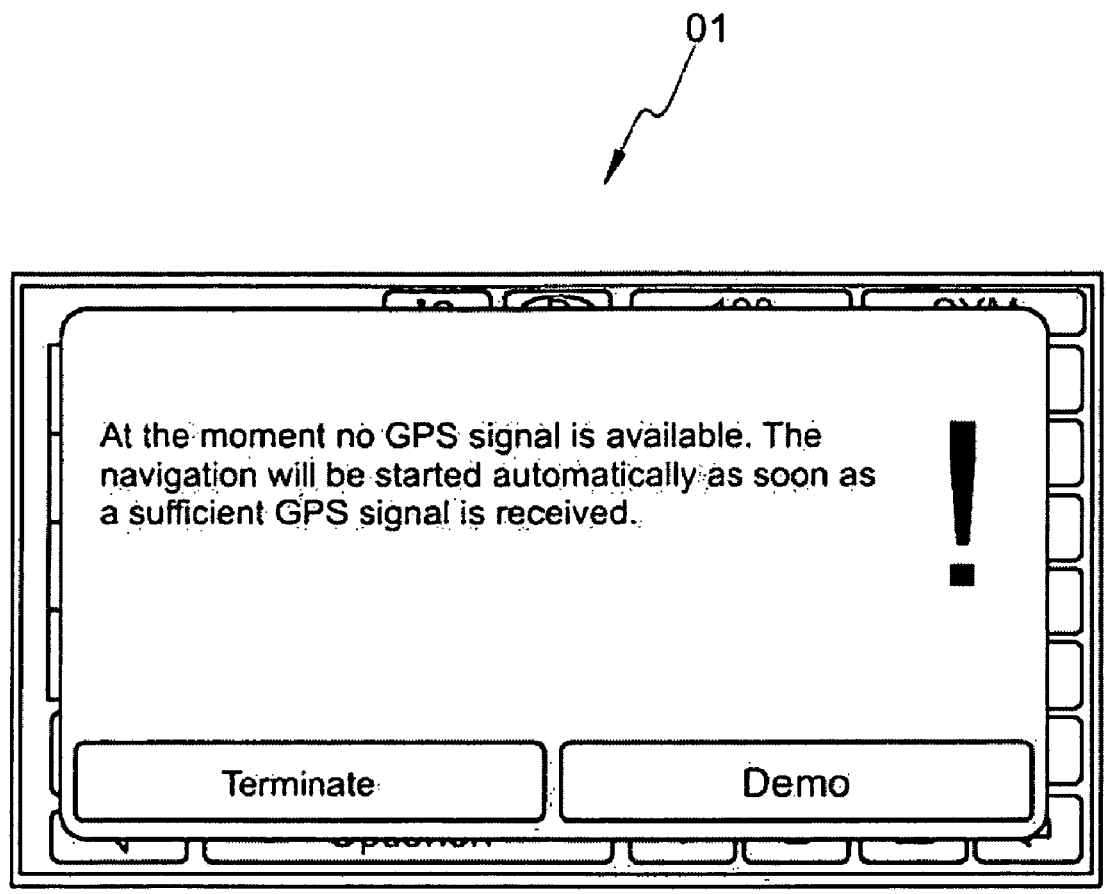
FIG. 2, the touch-screen according to FIG. 2 while displaying an inquiry menu for starting the simulation mode, and FIG. 3, the touch-screen according to FIG. 1 while displaying a simulated route preview.

According to FIG. 2, the user receives the information that a GPS signal of sufficient strength cannot be received. The user is simultaneously offered a simulation mode by pressing the button "Demo." If the user presses the "Demo" button, the simulation mode is started and a starting point for calculating a simulated route preview is derived from the destination "Würzburg, Berliner Platz 11." For example, the starting point derivation rule in the navigation system may specify that the starting point derived consists of the Point of Interest of the category "CityCenter" in Würzburg. As soon as the coordinates of this POI are selected from the road network database, a route from the Point of Interest of the category "CityCenter" in Würzburg to the destination "Berliner Platz 11" is calculated and output in the form of a simulated route preview.

Figure 3:
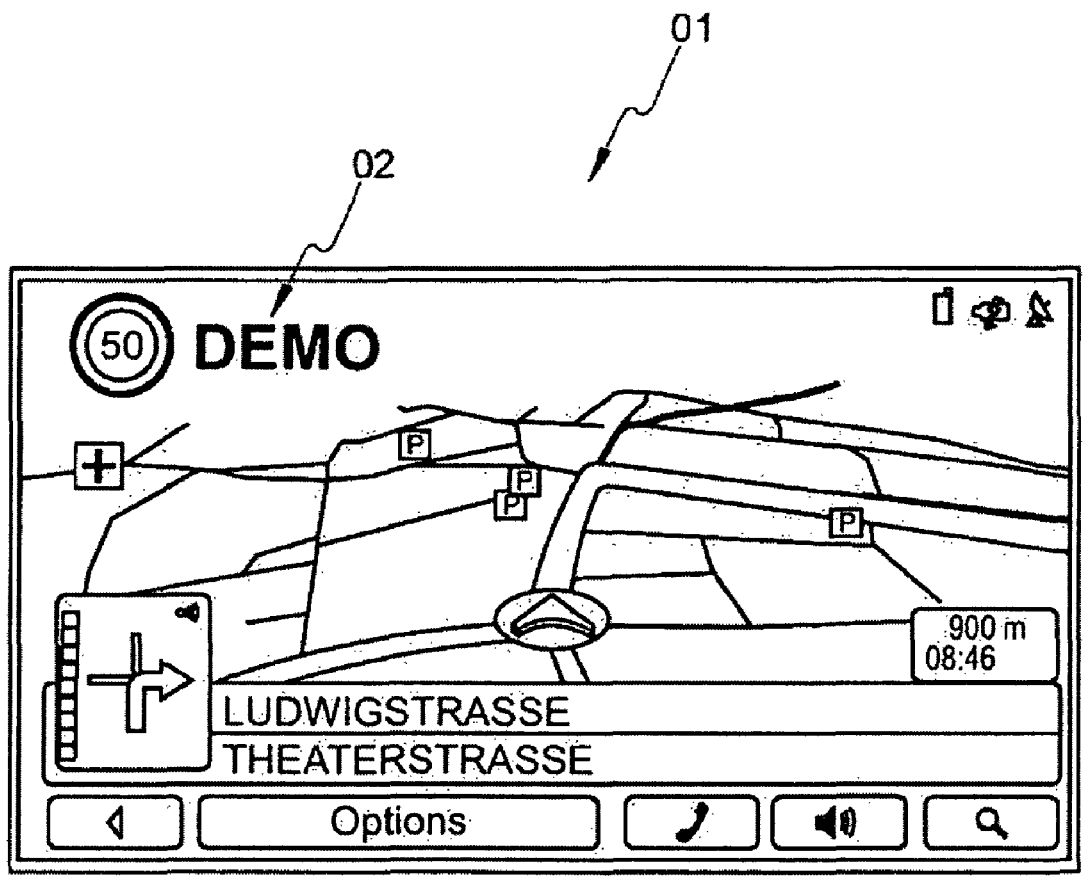

FIG. 3 shows the simulated route preview on the touch-screen 01. In this case, the display corresponds entirely to the display of a route preview in the normal mode with all corresponding functionalities. In order to inform the user that this is merely a simulated route preview, an identification element 02 "Demo" is superimposed in the left upper corner of the touch-screen 01.

I claim:

1. A method for operating a navigation system, said navigation system including:
    an input device for inputting operator commands and/or location information including starting points and/or destinations,
    a road network database, a route calculating unit for calculating a planned route with consideration of the location information and the road network database, wherein the route leads from the starting point to the destination, a signal receiving unit for receiving position signals, a position finding unit that determines the current position from the position signals, and at least one optical and/or acoustical output device for optically and/or acoustically outputting a simulated route preview in a simulation mode, wherein the simulated route preview simulates the route navigation from a starting point to a destination, wherein said method comprising the following steps:

a) inputting a destination;

b) deriving a starting point from the destination being input by utilizing a starting point derivation rule, wherein the starting point derivation rule specifies that the derived starting point lies in the same city or in the same town as the destination being input;

c) calculating a route from the derived starting point to the destination being input; and d) outputting the simulated route preview from the derived starting point to the destination being input.

2. The method according to claim 1, in which the navigation system checks if the current position can be determined from the position signals after a destination has been input, wherein the starting point is derived from the destination with the aid of the starting point derivation rule and the simulation mode of the navigation system is started if the current position cannot be determined from the position signals.

3. The method according to claim 1, in which the navigation system checks if the current position can be determined from the position signals after the simulation mode has been started, wherein the current position is set as the starting point and a normal mode of the navigation system is started after the termination of the simulation mode if the current position can be determined from the position signals.

4. The method according to claim 3, in which the simulation mode is automatically terminated if the current position can be determined from the position signals.

5. The method according to claim 3, in which the simulation mode is terminated if the current position can be determined from the position signals and the user consents to an inquiry whether to terminate the simulation mode with a positive response.

6. The method according to claim 1, in which the simulation mode is automatically started if the current position cannot be determined from the position signals.

7. The method according to claim 1, in which the simulation mode is started if the current position cannot be determined from the position signals and the user consents to an inquiry whether to start the simulation mode with a positive response.

8. The method according to claim 1, in which the derived starting point is a preferred point in the center of the same city or in the center of the same town as the destination.

9. The method according to claim 1, in which the derived starting point is a preferred point (Point of Interest/POI) of a certain category that lies in the same city or in the same town as the destination.

10. The method according to claim 9, in which the derived starting point is a preferred point (Point of Interest/POI) of a category that characterizes the center of a town or a city.

11. A method for operating a navigation system, said navigation system including:

an input device for inputting operator commands and/or location information including starting points and/or destinations, a road network database, a route calculating unit for calculating a planned route with consideration of the location information and the road network database, wherein the route leads from the starting point to the destination, a signal receiving unit for receiving position signals, a position finding unit that determines the current position from the position signals, and at least one optical and/or acoustical output device for optically and/or acoustically outputting a simulated route preview in a simulation mode, wherein the simulated route preview simulates the route navigation from a starting point to a destination, wherein said method comprising the following steps:

a) inputting a destination;

b) deriving a starting point from the destination being input by utilizing a starting point derivation rule, wherein the distance between the derived starting point and the destination being input and/or the length of the route preview is determined after the starting point has been derived, and a second starting point is derived from the destination being input with the aid of a second starting point derivation rule if the distance falls short of a predetermined minimum distance and/or the length falls short of a predetermined minimum lengthy;

c) calculating a route from the derived starting point to the destination being input; and d) outputting the simulated route preview from the derived starting point to the destination being input.

12. The method according to claim 11, in which the second starting point derivation rule specifies that the second starting point is a preferred point (Point of Interest/POI) that lies within a predetermined search radius around the first derived starting point.

13. The method according to claim 12, in which the search radius around the first starting point is increased incrementally until at least one preferred point (Point of Interest/POI) is determined.

14. A method for operating a navigation system, said navigation system including:

an input device for inputting operator commands and/or location information including starting points and/or destinations, a road network database, a route calculating unit for calculating a planned route with consideration of the location information and the road network database, wherein the route leads from the starting point to the destination, a signal receiving unit for receiving position signals, a position finding unit that determines the current position from the position signals, and at least one optical and/or acoustical output device for optically and/or acoustically outputting a simulated route preview in a simulation mode, wherein the simulated route preview simulates the route navigation from a starting point to a destination, wherein said method comprising the following steps:

a) inputting a destination;

b) deriving a starting point from the destination being input by utilizing a starting point derivation rule, wherein the distance between the derived starting point and the destination being input and/or the length of the route preview is determined after the starting point has been derived, and a new starting point is derived from the destination being input with the aid of a third starting point derivation rule if the distance exceeds a predetermined maximum distance and/or the length exceeds a predetermined maximum length;

c) calculating a route from the derived starting point to the destination being input; and d) outputting the simulated route preview from the derived starting point to the destination being input.

15. The method according to claim 11, in which the second starting point derivation rule specifies that the second starting point is a preferred point (Point of Interest/POI) that lies in the same city or in the same town as the destination and falls under a different category than the first starting point.

16. The method according to claim 1, in which the route from the derived starting point to the destination being input is driven with a predetermined speed profile in the route preview of the simulation mode, wherein maneuvering instructions required along the route are optically and/or acoustically output.

17. The method according to claim 1, in which at least partially interactive user commands that are also available in a normal mode of the navigation system are accepted during the route preview of the simulation mode.

18. The method according to claim 1, in which an identification element assigned to the simulated route preview is output during the output of the simulated route preview.

* * * * *